United States Patent
Ohba et al.

[11] Patent Number: 5,241,664
[45] Date of Patent: Aug. 31, 1993

[54] MULTIPROCESSOR SYSTEM

[75] Inventors: Nobuyuki Ohba; Shigenori Shimizu, both of Kawasaki, Japan

[73] Assignee: International Business Machines Corporation, Armonk, N.Y.

[21] Appl. No.: 637,902

[22] Filed: Jan. 7, 1991

[30] Foreign Application Priority Data

Feb. 20, 1990 [JP] Japan .................................. 2-37536

[51] Int. Cl.⁵ ...................... G06F 13/00; G06F 12/12
[52] U.S. Cl. .................................. 395/425; 395/275;
364/DIG. 1; 364/243.41; 364/228.1;
364/229.2; 364/931.4; 364/931.46
[58] Field of Search .............................. 395/425, 400;
364/200 MS File, 900 MS File

[56] References Cited
U.S. PATENT DOCUMENTS 3,938,097  2/1976  Niguette, III .................. 364/200
4,755,930  7/1988  Wilson, Jr. et al. ............. 395/425
4,969,088  11/1990  McAulliffe et al. ............. 395/325

*Primary Examiner*—Joseph L. Dixon
*Assistant Examiner*—Frank J. Asta
*Attorney, Agent, or Firm*—George E. Clark

[57] ABSTRACT

A cache coherency system and method which switches the data consistency maintenance protocol used for a given piece of shared data at each private cache, automatically depending upon the likelihood or frequency that the processor having the private cache concerned will accesses the given piece of shared data, and the likelihood or frequency that the other processors in a multiprocessor system will access the given piece of shared data. In the preferred embodiment, the present system and method switches between protocols of the invalidate and update types. When the processor corresponding to the private cache concerned is more likely to access the shared data concerned, it is uses the protocol of the update type because it increases the cache hit ratio. On the other hand, while other processors in the system are more likely to access the shared data concerned, it uses the protocol of the invalidate type because it reduces bus traffic required for updating the shared data. In an exemplary configuration, for each piece of shared data in each private cache, the frequency at which the processor corresponding to the private cache concerned accesses the shared data is determined. Further the frequency at which the other processors in the system modify the shared data concerned is determined. The difference between the above frequencies is calculated and compared with a predetermined reference value. The result of the comparing is used to automatically switch the protocols used for the shared data concerned at the private cache concerned.

8 Claims, 9 Drawing Sheets

CACHE TAG

| V | S | D | ACCESS COUNT | ADDRESS INFORMATION |
|---|---|---|---|---|

V : VALID FLAG
    0 : INVALID
    1 : VALID

S : SHARED FLAG
    0 : EXCLUSIVE
    1 : SHARED

D : DIRTY FLAG
    0 : CLEAN
    1 : DIRTY

ACCESS COUNT : UP – DOWN COUNTER

ADDRESS INFORMATION : SAME AS CONVENTIONAL CACHE

CACHE TAG

| V | S | D | ACCESS COUNT | ADDRESS INFORMATION |
|---|---|---|---|---|

V : VALID FLAG
    0 : INVALID
    1 : VALID

S : SHARED FLAG
    0 : EXCLUSIVE
    1 : SHARED

D : DIRTY FLAG
    0 : CLEAN
    1 : DIRTY

ACCESS COUNT : UP − DOWN COUNTER

ADDRESS INFORMATION : SAME AS CONVENTIONAL CACHE

FIG. 3

MULTIPROCESSOR SYSTEM

BACKGROUND OF THE INVENTION

1. Field of the Invention

This invention relates to a multiprocessor system having a plurality of processors connected to a shared bus and a shared memory through respective private caches. More particularly, this invention relates to such a multiprocessor system adopting a so-called snoopy cache architecture wherein each private cache is provided with a controller which monitors signals on the shared bus and manipulates data in the private cache, for example, for maintaining data consistency among the private caches.

2. Related Art

While there are a number of types of conventional multiprocessor systems, tightly coupled multiprocessor systems are increasingly coming into practical use.

In one such type of tightly coupled multiprocessor system, a plurality of processors read from or write to a shared memory connected to a shared bus. Without private caches, each processor has to accomplish read/write access to the shared memory through the shared bus. Therefore the shared memory is frequently occupied. Thus, in such an environment, an increase in the number of processors can not improve the performance of the system beyond a certain limit.

An approach has been proposed wherein each processor has a private cache in which it keeps a partial copy of data stored in the shared memory. Each processor performs read/write access to the data within its private cache, and thereby the shared bus and memory are not used as frequently. The above described approach is commonly referred to as a multi-cache system. That approach, however, causes a problems in that when each processor modifies shared data in its cache without relation to other sharing processors, the sharing processors may, at any instant in time, have different data at a given address. Means for maintaining consistency of data at a given address in different caches is accordingly needed. Hereinafter, "the consistency of data" means that every processor looks at the same data at a given address.

One method for ensuring the consistency of data is the snoopy cache technique. The snoopy cache technique maintains the consistency of data among caches by having each processor's cache controller monitor the shared bus. That is, when a processor modifies shared data in its cache (i.e. data that is shared by one or more other processors), it sends information about how it modified the data and what address the modified data is at, on the shared bus. The cache controllers of the other processors see that information and update or invalidate the data in their caches to maintain the consistency of data.

Conventional snoopy cache techniques will typically adopt one of two conventional protocols to handle modification of shared data. According to the first conventional protocol, upon modification to shared data at a cache, copies at the other caches are invalidated. According to the second conventional protocol, upon modification to shared data at a cache the copies at the other caches are modified. For example, Dragon ("The Dragon Processor", Proceedings of Second International Conference on ASPLOS, 1987, pp. 65-69, R. R. Atkinson, et. al.) of the Xerox Corporation (USA), and FireFly ("Firefly: a Multiprocessor Workstation", Proceedings of the Second International Conference on ASPLOS, 1987, pp. 164-172, C. P. Thacker et al.) of Digital Equipment Corporation (USA), use the update type. On the other hand, SPUR ("Design Decision in SPUR", IEEE Computer, pp. 8-22, November 1986, M. Hill et al.) of the University of California uses the invalidate type.

The above two types can equally maintain the consistency of data among a plurality of caches. That is, the updating and invalidating of data have the same effect with respect to consistency. However they both have merits and demerits in accordance with their approaches.

The update type is suitable for cases where the data is tightly shared by the processors (or where the processors almost equally access shared data). The invalidate type is not suitable for those cases, because each time a processor modifies a shared data area, the copies in the caches of the other sharing processors are invalidated. Thus, a read/write access to that area by the other sharing processors inevitably causes a cache miss and requires access to the shared bus. In this regard, the update type cache is advantageous since the copies in the sharing caches are updated, thereby enabling the processors to read the data area without accessing to the shared bus. Generally speaking, the update type works well when used for buffers in a parallel program of the producer and consumer model, and semaphore or the like used to synchronize processors, etc.

The invalidate type, on the other hand, is preferably applied to shared data which is exclusively used by one processor or to shared data which is not accessed frequently by the other processors. Paging or process migration may cause data exclusively held by one processor to be considered shared while it should be kept as exclusive. This situation places unnecessary shared data in the system and degrades performance. The invalidate type is effective in that situation.

In light of the strengths and weaknesses of each, a preference between the above types of protocols can not be decided in a straightforward manner. This is because the performance of the system under a given protocol depends on the characteristics of a program to be executed and the operational status of individual processors. Thus far, the use of the above-described conventional protocols has not enabled efficient operations in every data access situation.

The above mentioned Dragon, FireFly and SPUR each provide only one type of protocol, and consequently achieve only degraded performance in some situations. A prototype machine, TOP-1, of the International Business Machines Corporation, can selectively switch between the above mentioned types of protocols by means of software. This, however, still does not resolve the problem of how and when to switch. The resolution of that problem is a key factor in achieving full performance enhancement.

SUMMARY OF THE INVENTION

An object of the invention is accordingly to provide a mechanism enabling efficient and dynamic switching between the protocols of the invalidate and update types.

The above-described object is achieved by switching the protocol used for a given piece of shared data at each private cache, automatically depending upon the likelihood or frequency that the processor having the private cache concerned will accesses the given piece of shared data, and the likelihood or frequency that the other processors in the multiprocessor system will access the given piece of shared data. This mechanism can reduce traffic on the shared bus and improve the system performance.

In the preferred embodiment, the present system and method switches between protocols of the invalidate and update types. When the processor corresponding to the private cache concerned is more likely to access the shared data concerned, it is more preferable to use the protocol of the update type because it increases the cache hit ratio. On the other hand, while other processors in the system are more likely to access the shared data concerned, it is more preferable to use the protocol of the invalidate type because it reduces bus traffic required for updating the shared data.

In an exemplary configuration, for each piece of shared data in each private cache, the frequency at which the processor corresponding to the private cache concerned accesses the shared data is determined. Further the frequency at which the other processors in the system modify the shared data concerned is determined. The difference between the above frequencies is calculated and compared with a predetermined reference value. The result of the comparing is used to automatically switch the protocols used for the shared data concerned at the private cache concerned.

BRIEF DESCRIPTION OF THE DRAWINGS

The present invention will be better understood by reference to the drawings, in which:

FIG. 3 is a diagram illustrating the format of the cache tag stored in the case tag memory 5 in FIG. 2;

Key:
P.. processor, C.. private cache, 1.. shared bus, 2.. shared memory, 3.. cache controller, 4.. cache data memory, 5.. cache tag memory, 6.. reference register, 7.. comparator.

DETAILED DESCRIPTION OF THE PREFERRED EMBODIMENT

A. Configuration Of The Embodiment

An embodiment of the invention is described in detail below.

Figure 1:
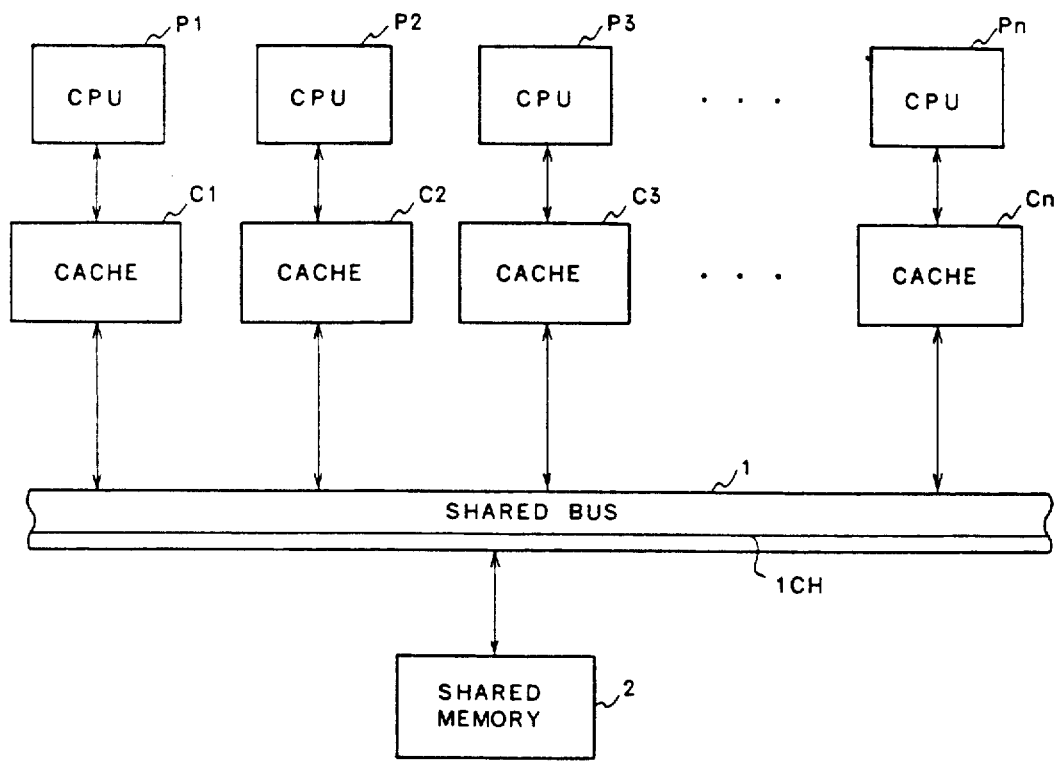
FIG. 1 is a block diagram illustrating the overall configuration of one embodiment of this invention.

FIG. 1 shows the overall configuration of the multiprocessor system of the embodiment, wherein a plurality of processors P1, P2, ... Pn are connected to a shared bus 1 and shared memory 2 via respective caches C1, C2, ... Cn. The caches C1, C2, ... Cn enable the processors P1, P2, ... Pn to perform memory access more rapidly on average and have means for maintaining the consistency among the caches C1, C2, ... Cn.

Each of the caches C1 ... Cn is configured as shown in the exemplary cache C of FIG. 2, wherein a cache controller 3 performs basic control of the the whole of the cache C, required when the cache C is accessed by the corresponding processor P, and when snooping the bus 1. A cache data memory 4 is a high speed memory for storing a partial copy of data stored at the main memory (the shared memory 2). The cache data memory 4 is, for example, capable of storing 16 data blocks each having 64 bits. The processor P can read/write required data via the data memory 4, often without accessing the main memory (the data block is a unit of data in accessing). The processor P can therefore perform more rapid memory access on average. A cache tag memory 5 is designed to store a cache tag as shown in FIG. 3 for each data block stored in the cache data memory 4. The cache tag includes fields for V, S, D, an access count, and address information, as described in detail later. A reference register 6 is designed to store a reference value in relation to the access counts in the cache tags stored in the cache tag memory 5. A comparator 7 is designed to compare the access count in the cache tag specified with the address information, with the reference value and supply the comparison result to the cache controller 3.

Next the cache tag is described in detail.

As shown in FIG. 3 the cache tag is constituted of the fields of V, S, D, an Access count, and address information. The address information is the same as used for the data block corresponding to the cache tag concerned. V, S, and D are, respectively, valid, shared, and dirty flags, and indicate the state of the data block identified with the address information as follows:

V: valid flag
  0: invalid
  1: valid
S: shared flag
  0: exclusive
  1: shared
D: dirty flag
  0: clean (having the same contents as the shared memory)
  1: dirty (having different contents than the shared memory)

The access count is held in an up-down counter of a predetermined number of bits, the control method of which is described later.

Next the statuses of the data blocks in the cache data memory 4 are described. It is those statuses as well as the access count that the cache controller 3 controls data blocks depending on the state transitions, which are described later in connection with the operations of the embodiment.

Figure 4:
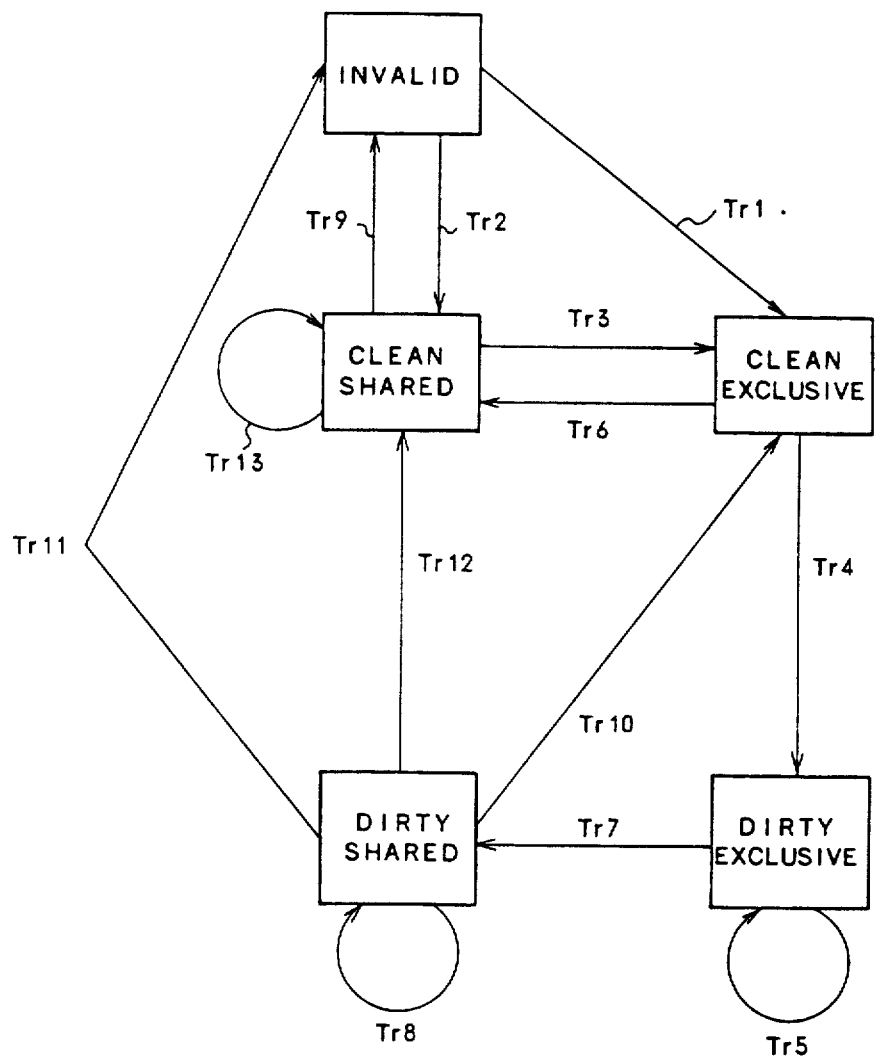
FIG. 4 is a state transition diagram for the data blocks in the cache controller of FIG. 2.

There are five potential states of a data block in the cache data memory 4 as shown in FIG. 4. These five states are described in more detail below:

(1) invalid
(2) clean-exclusive: the data is a single copy in the system, and keeps the same value as in the shared memory.
(3) clean-shared: it is possible that a plurality of copies exist in the system. Write back is not required upon replacing.
(4) dirty-exclusive: there is a single copy of the data in the system, which is, however, a different value from the shared memory. Write back is required upon replacing.
(5) dirty-shared: it is possible that a plurality of copies exist in the system. Write back is required upon replacing.

The above five states are maintained using the V, S and D flags in the cache tag as shown in FIG. 3. The correspondence between the tags and the states is as set forth in Table 1. In this table "X" indicates "don't care".

TABLE 1

| State | Combination of the flag content | | |
|---|---|---|---|
| | V | S | D |
| invalid | 0 | X | X |
| clean-exclusive | 1 | 0 | 0 |
| clean-shared | 1 | 1 | 0 |
| dirty-exclusive | 1 | 0 | 1 |
| dirty-shared | 1 | 1 | 1 |

Next the control of the access count is described.

Conventional snoopy protocols have a cache tag including a D (dirty) flag, an S (shared) flag, and a V (valid) flag, and thereby control the statuses of data blocks.

In this embodiment, the access count field is provided in addition to those flags (FIG. 3). The control for shared copies of data in the caches is optimized by using the relationship between the the reference value (the above mentioned register 6) and the value in the access count field. The access count field is a counter which holds a positive value. The value is incremented or decremented in accordance to the following rules.

Rules of Access Count (1) the access count (AC) is incremented by one upon each bus write. It is however limited to less than or equal to a predetermined value M (AC<=M)

(2) The access count is decremented by one each time the corresponding processor accesses the corresponding data block. It is however limited to a value greater than or equal to zero (AC> =0).

In summary, the access count field holds the difference between the frequency of write requests for the block concerned sent on the bus (from other processors), and the frequency of access request for the same block from the corresponding processor.

Hereinafter the state where this field has reached the reference value (M) is referred to as R (Reached) state (in this state, the value in the access count field =the value in the M register). M is held in the reference register of FIG. 2, and can be updated with software.

The cache controller 3 operates so as to perform the protocol of the update type in the R state, and to perform the protocol of the invalidate type when not in the R state (referred to hereinafter as the TR state). When the reference value (M) is set to zero the protocol is of the conventional invalidate type, and when set to infinite or overflow (practically impossible for the AC to reach due to the bit width limitation of the access count field) the protocol is of the conventional update type.

The reference value for optimizing the cache performance is determined based on the cache configuration (the block size, the access width of the processor P), the penalty for bus use (cycle duration of bus read and bus write), the number of caches in the system, etc. The optimization factors are described later.

B. Operation of the Embodiment

The operation of this embodiment is described with reference to the state transition diagram of FIG. 4.

The cache controller 3 makes reference to the cache tag each time the processor P accesses the cache data memory 4 of its associated private cache C and each time the processor P monitors (snoops) the bus 1 for traffic caused by another processor. The controller 3 thereby determines how to operate. At the same time it determines whether or not the state is R based on the output from the comparator 7 which compares the value of the access count to the value in the reference register 6.

A data block is controlled with the aforementioned five states. The CH (cache Hit) signal line is a special purpose signal line provided to the bus 1 and indicates whether the block concerned is in the shared or exclusive state in the caches. The cache controller 3 asserts the CH signal when it receives a read or write signal from the bus and its corresponding cache C has a copy of the data concerned. Asserting the CH signal informs the requesting cache C that the cache C corresponding to the asserting controller has the copy.

A unique point of the embodiment is that the access count field is added in the cache tag for use in transition among the five states. As shown in FIG. 3, the cache tag of the embodiment consists of not only the address information used for conventional caches C but also the three flags of valid, shared, and dirty types and the access count field operating as an up-down counter.

Figure 2:
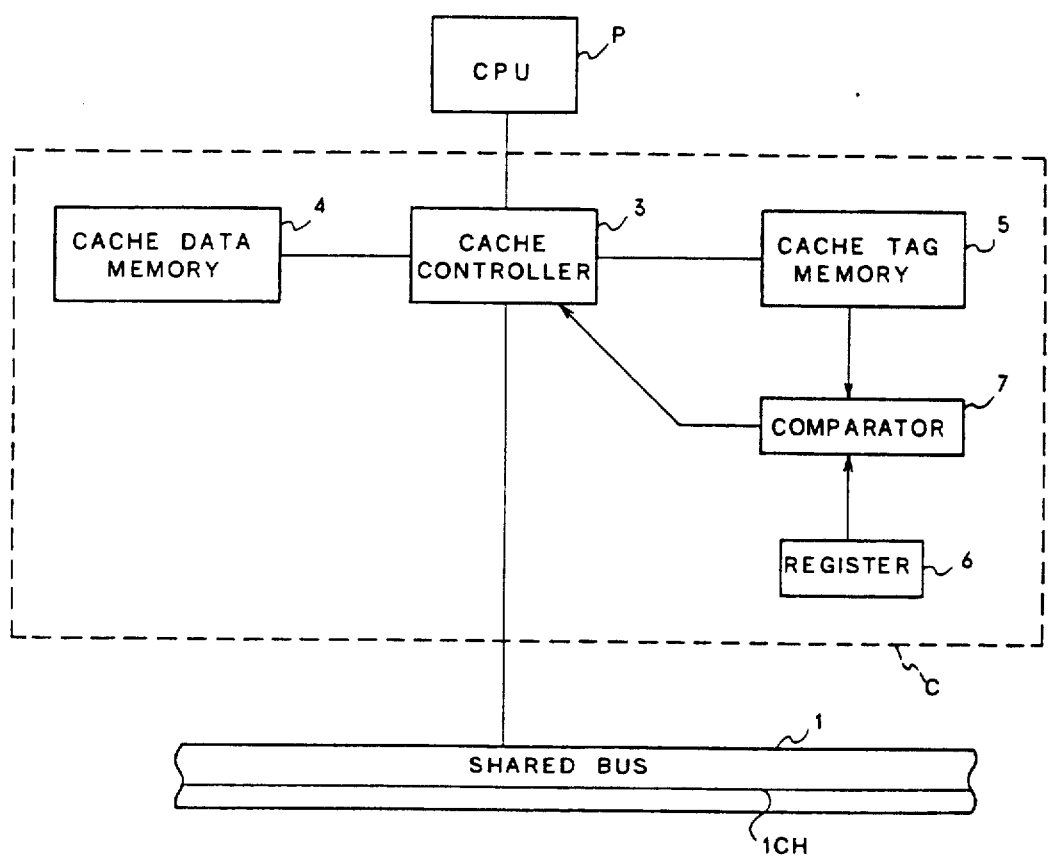
FIG. 2 is a block diagram illustrating the configuration of the private cache used in the embodiment of FIG. 1.

Conditions for each transition, and operations during each of the transitions are listed below and will be better understood by reference to the exemplary processor P and private cache C of FIG. 2.

transition 1: invalid→clean-exclusive

This transition occurs when the processor P performs a read operation and a copy of the data does not exist in the associated private cache C. A cache miss occurs, and no CH signal is asserted. At the conclusion of the read operation the associated cache C has is the only one having a copy of the data (i.e. no other caches Cn have a copy of the data).

transition 2: invalid→clean-shared

This transition occurs when the processor P performs a read operation and a copy of the data does not exist in the associated private cache C. A cache miss occurs, and one or more CH signals are asserted. At the conclusion of the read operation, the associated cache C, and at least one other cache Cn has copy of the data.

transition 3: clean-shared→clean-exclusive

This transition occurs when the processor P performs a write operation, a cache hit occurs (in the associated private cache C), and no other caches Cn assert a CH signal. The data block is accordingly set to a exclusive state.

transition 4: clean-exclusive→dirty-exclusive

This transition occurs when the processor P performs a write operation and a cache hit occurs. Since only the associated private cache C of the processor P has a copy of the data, the processor P can modify the copy without informing the other processors Pn. At the conclusion of the write operation, the private cache C has a different contents than the shared memory 2 (FIG. 1). The state is accordingly changed to dirty-exclusive.

transition 5: dirty-exclusive→dirty-exclusive

This transition occurs when the processor P performs a write operation and a cache hit occurs. Since only the associated private cache C has a copy of the data, the processor P only modifies the copy.

transition 6: clean-exclusive→clean-shared

This transition occurs when another processor Pn causes a read miss thereby sending a read signal on the shared bus 1, and only the private cache C of the processor P has a copy of the data. Since a copy of the data is to be placed in another cache (cache Cn of processor Pn), a CH signal is asserted and the block goes into a clean-shared state.

transition 7: dirty-exclusive→dirty-shared

This transition occurs when another processor Pn causes a read miss thereby sending a request signal on the shared bus 1, and only the private cache C of the processor P has a copy of the data, the copy being the newest data and different from the contents stored in the shared memory. The cache C of the processor P supplies the other cache Cn with the newest data and asserts a CH signal to get into a shared state.

transition 8: dirty-shared→dirty-shared

This transition occurs when another processor Pn causes a read miss thereby sending a read signal on the shared bus, and the private cache C of the processor P has the copy comprising the newest data. The cache C supplies the newest data to the requesting cache Cn and asserts a CH signal.

transition 9: clean-shared→invalid

A bus write request occurs for a block in a clean-shared state, and the block happens to have an access count field of the R state. The block is accordingly invalidated and no CH signal is sent.

transition 10: clean-shared→clean-exclusive

The processor P causes a write hit. It is possible that one or more other caches Cn have copies, and the associated cache C of processor P accordingly issues a write request on the shared bus. It is thereafter determined that no other cache asserts a CH signal. The state is accordingly changed to clean-exclusive and the access count field is set to the initial zero value.

transition 11: dirty-shared→invalid

A bus write request is issued for a block in a dirty-shared state, and that block is in a R state. The block is accordingly invalidated and no CH signal is asserted.

transition 12: dirty-shared→clean-shared

This transition occurs on either of the following two conditions.

(1) The processor P causes a write hit, and sends a write request on the shared bus because one or more other processors Pn possibly have copies. Updating is performed in the shared memory 2 (FIG. 1) at the same time. A CH signal is consequently asserted by the other one or more caches Cn, and then the states are changed to clean-shared. The access count field is decremented by one.

(2) A bus write request occurs for a block in a dirty-shared state, and the block is in a TR state. The block is updated and the state is changed to clean-shared. The access count field is incremented by one.

transition 13: clean-shared→clean-shared

This transition occurs on either of the following three conditions.

(1) The processor P causes a write hit and sends a write request on the shared bus because one or more other processors possibly have copies. Updating is performed in the shared memory 2 at the same time. A CH signal is consequently asserted by the other one or more caches, and then the states remain unchanged. The access count field is decremented by one.

(2) A bus read request occurs.

(3) A bus write request occurs and the block is in a TR state. The block is accordingly updated and A CH signal is asserted. The access count field is incremented by one.

In the above, 'description concerning a read hit from the processor P is omitted for purposes of simplified illustration. A read hit from the processor P does not cause any transition. However, a read hit for a block in a shared state causes the access count field to be decremented.

C. Effectiveness of the Embodiment

As aforementioned, a significant aspect of the invention is the manner of manipulating shared data. Whenever a processor P modifies shared data, the consistency of the data is maintained by updating or invalidating related copies in other caches.

Figure 5:
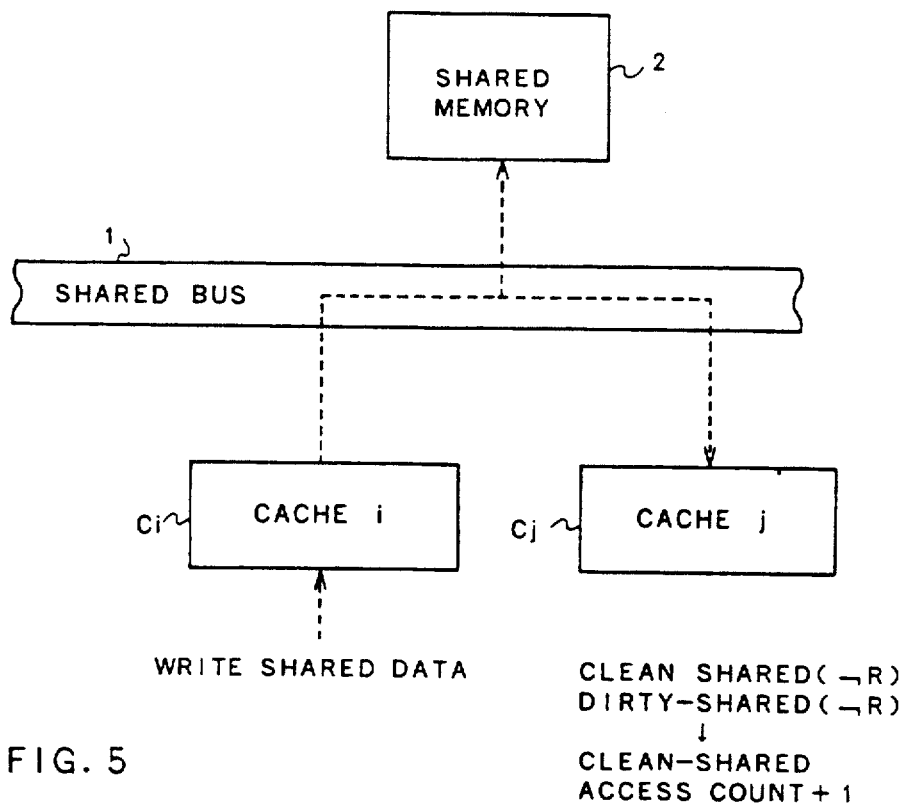
FIGS. 5 through 10 are diagrams illustrating the operations of the embodiment.
Figure 6:
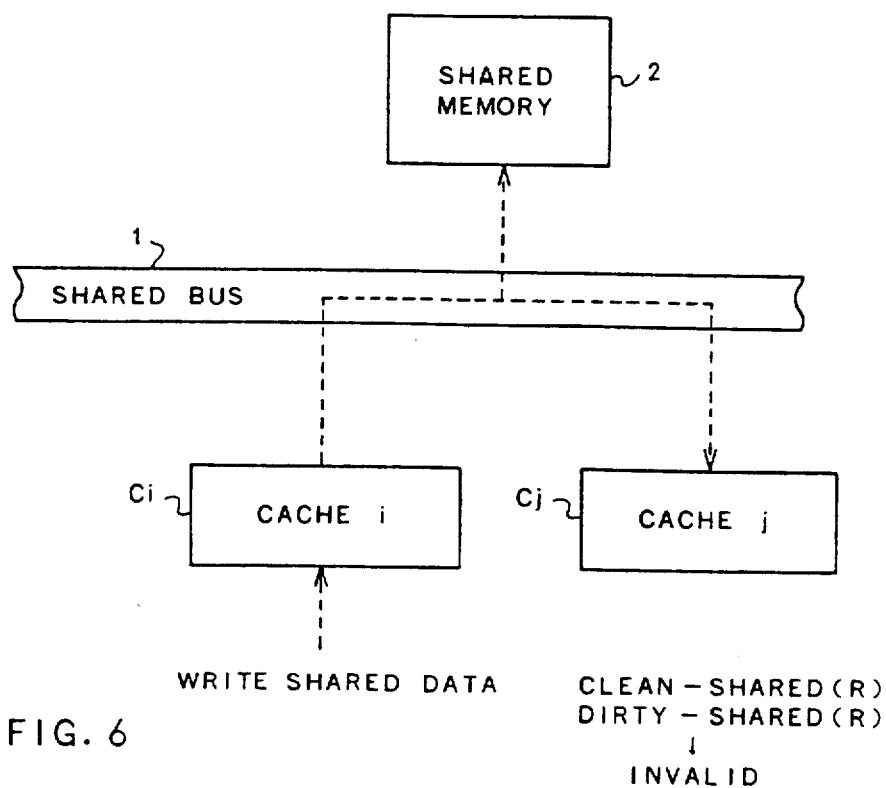
Figure 7:
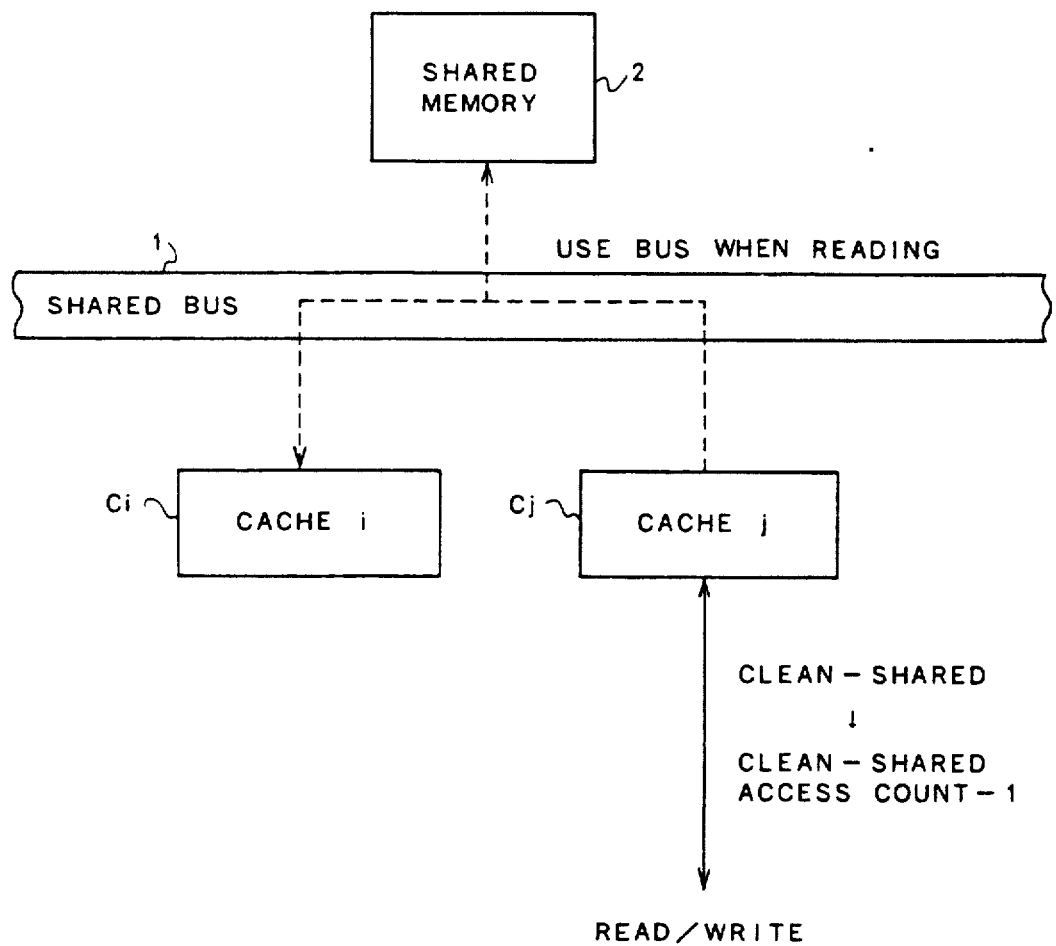

In the method of the present embodiment, shared data exists in a state of clean-shared or dirty-shared. In this regard the protocol of the invention is identical to conventional snoopy protocols. However the access count field is added in the cache tag for minimizing overhead related to shared data, and thereby a block in a shared state is provided with an R attribute indicative whether or not the access count field has reached a reference value (M). When a processor Pi causes a cache hit as to shared data and accordingly issues a bus write request, shared copies in the other caches Cj, in the TR state, are updated, and then the related access counts are incremented by one to record the updating (FIG. 5). Shared copies in an R state are invalidated (FIG. 6). Further, when the processor Pj accesses a shared copy, the access count is decremented by one (FIG. 7). Whether or not the block should be updated or invalidated is determined automatically by the difference between the frequency of updating a shared block by another processor Pn and the frequency of accessing the same shared block by the processor P.

In the case where the reference value M is "1", the operations are simpler as described as follows. When a shared block in the cache C of the processor P is updated by any other processor Pn more than once without intervening access by the processor P, the block will be invalidated. On the other hand, when the processor P accesses a shared block at least one time in the duration defined by two consecutive update requests to the block from another processor Pn, the block remains in the cache C.

Figure 8:
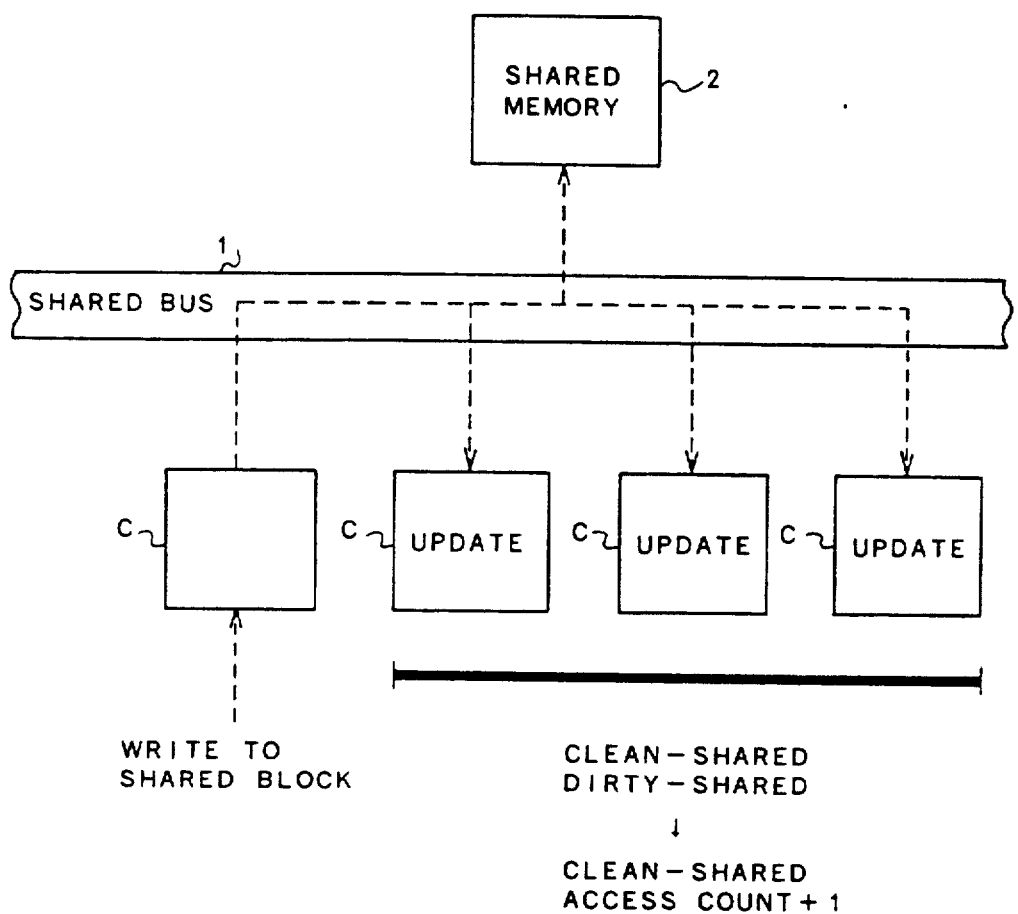
Figure 9:
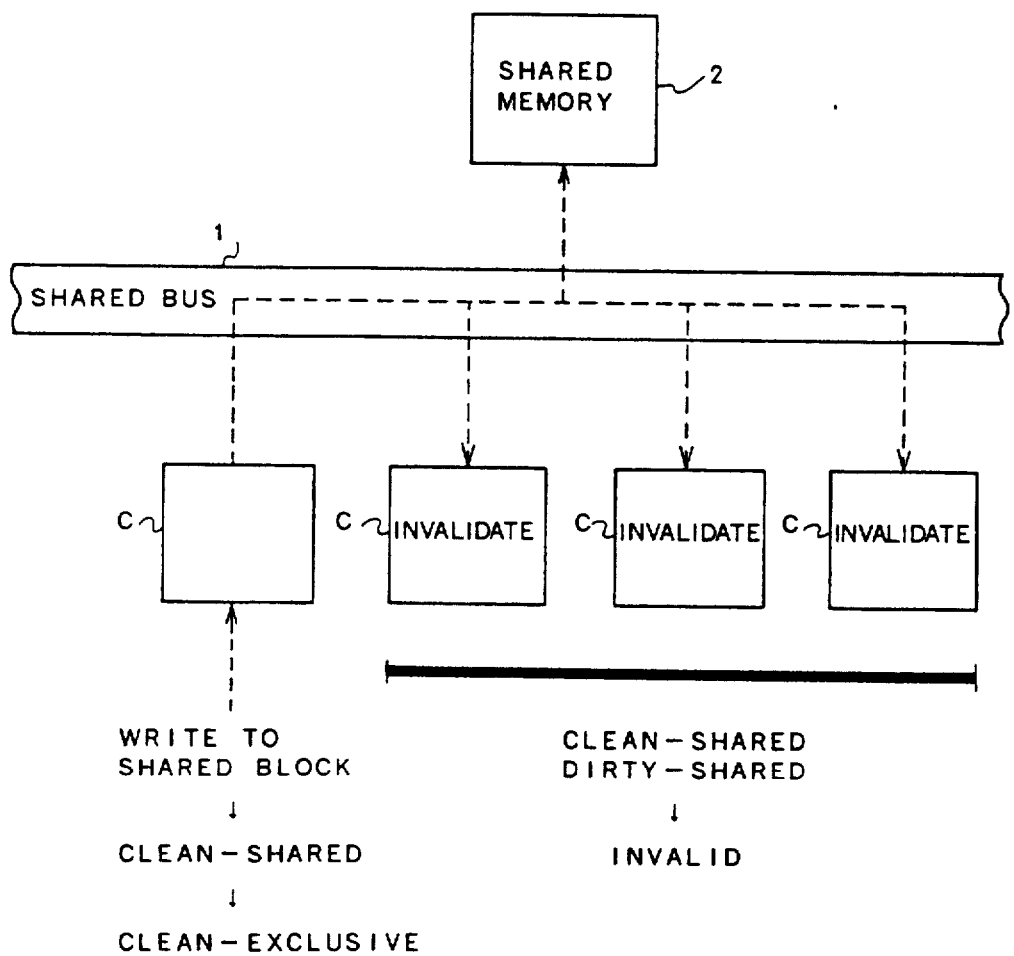

The operation and the effectiveness of the embodiment are summarized as follows. The embodiment operates in the same way as conventional update types for shared blocks which are frequently read/written by a plurality of processors P1 . . . Pn. That is, when write access occurs for each of such shared blocks, the relevant copies stored in a plurality of caches are immediately updated but not invalidated (FIG. 8). In the contrast, for a shared block in a cache C which is not frequently accessed by other than its one corresponding processor P, only the copy in that one processor remains and the copies in the other caches are invalidated.

Figure 10:
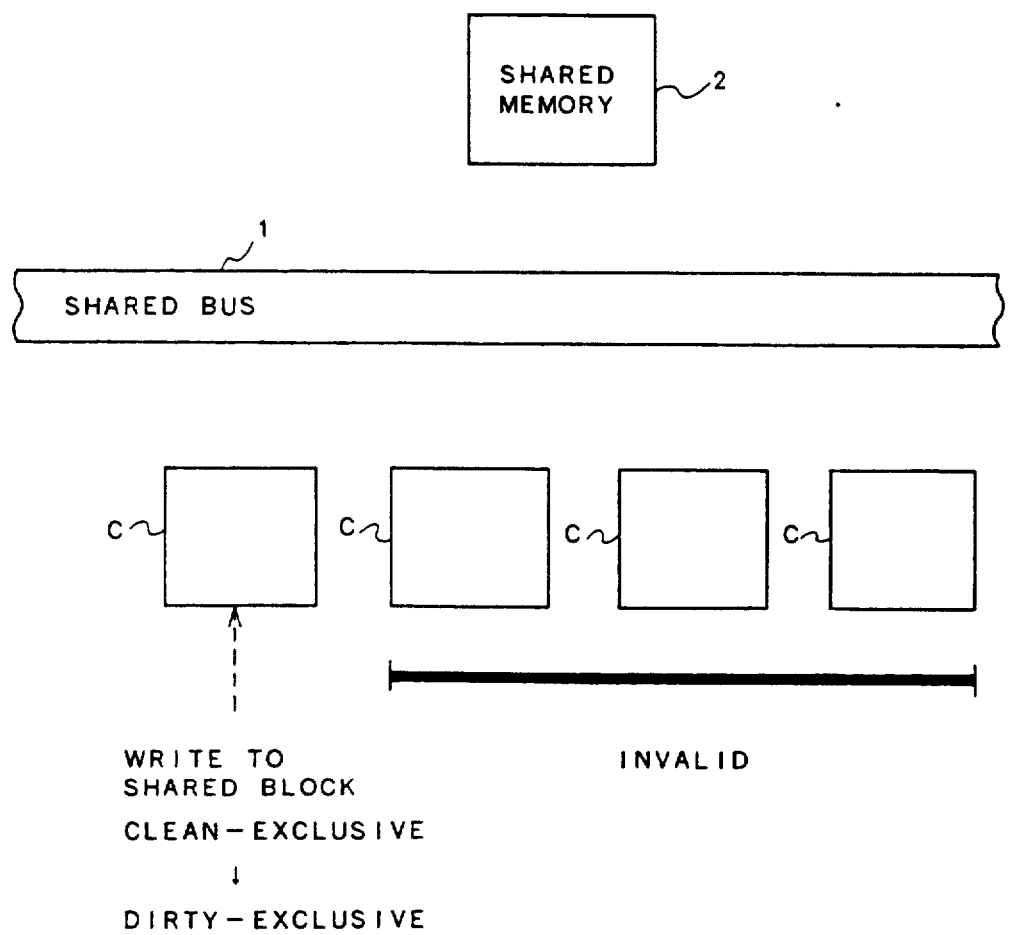

After the invalidating, that one cache C operates independently from the others, because the others don't keep the copies (FIG. 10).

As described above, a snoopy cache C of the embodiment operates, at a time, in the same way as the update type caches, for shared data which is desired to exist as shared data in that cache at that time. And the snoopy cache operates in the same way as the invalidate type caches, for shared data which is originally not required to be shared data, or likewise operates at a time, for shared data which is preferably shared data in a long span but a single processor preferably performs exclusive read/write operations for efficient performance at that time.

The value M, which is a decisive factor for switching between the update and invalidate types, is optimized depending on the number of processors, the block size of the caches, patterns of read/write operations in a particular program, etc, and cannot easily determined. In the following paragraphs, the block size and the characteristics of the program are exemplified, and then the effects of various values of M on performance are described.

Assumptions:

(1) The program is "producer and consumer" model. A producer produces predetermined data configurations sequentially, and write them into a data buffer provided in the shared memory. A consumer reads data configurations from the data buffer and processes them. The producer and consumer are assigned to separate processors P.

(2) The producer and consumer access data word by word.

(3) The block size of the caches is eight words wide.

(4) The shared bus 1 transfers eight words in one block in the caches C in one cycle time.

(5) Invalidation in the caches uses one cycle on the shared bus 1.

Following the above assumptions, the system performance is evaluated in terms of the number of cycles consumed on the shared bus, in regard to the two situations below.

Situation 1

Assume that the producer produces 8 words of data and writes them into the cache C, and consumer thereafter reads and processes the 8 words of data (the data configuration may be considered as of 8 words). When $M=0$, the caches operate in the same way as the invalidate type, thereby at the time the producer writes the first word of the 8 words in the producer's cache, the block in the consumer's cache is invalidated. At this time one cycle is consumed on the bus. As a result, the remaining 7 words exist only in the producer's cache, the modification of the data occurs in the producer's cache, and the bus 1 is not used. Next, the consumer tries to read the first of the 8 words, and then the block of the 8 words is transferred by using 1 cycle on the bus 1. Thus, the bus 1 is used for two consecutive cycles. Next, when $M=8$, the caches operate in the same way as the update type. Therefore, at the time the producer writes 8 words in series, the bus 1 is used for 8 cycles, one cycle for each word. The consumer's data block has already updated in its cache, and therefore the consumer only reads from its cache without using the bus 1. As a result, the bus is used for 8 consecutive cycles. TABLE 2 shows the number of cycles for which the bus is used with each M value. In this situation, $M=0$, that is, the invalidate type achieves the best performance, with two cycle times of bus use.

TABLE 2

| M | Frequency of bus used | | |
|---|---|---|---|
| | Producer | Consumer | Total |
| 0 | 1 | 1 | 2 |
| 1 | 2 | 1 | 3 |
| 2 | 3 | 1 | 4 |
| 3 | 4 | 1 | 5 |
| 4 | 5 | 1 | 6 |
| 5 | 6 | 1 | 7 |
| 6 | 7 | 1 | 8 |
| 7 | 8 | 1 | 9 |
| 8 | 8 | 0 | 8 |

Situation 2

Assume another situation wherein each time the producer writes one word of data, the consumer reads and processes that word. In the case of $M=0$, when the producer writes the first word of data, the consumer's data block is invalidated and the bus is used once (for one cycle). Following that, when the consumer reads the first word of data, it uses the bus once to place in the newest data, since the data in its cache has been invalidated. Further the producer uses the bus 1 once to write the second word of data, and the consumer also uses the bus 1 once to read the second word of data. For one block, i.e., 8 words in the caches C, the bus 1 is used for $16 (=2\times 8)$ cycles in total. Next, in the case of $M=8$, each time the producer writes a word, the consumer s data block is updated and thereby the bus is used once. The consumer does not, however, use the bus 1 during the read operation because the consumer's cache has been already updated. The bus 1 is accordingly used 8 $(=1\times 8)$ times. TABLE 3 shows the number of cycles for which the bus 1 is used with each M value. From this table it will be apparent that this situation causes 8 cycle times of bus use with $M=1$ to 8, and 16 cycle times with $M=0$.

TABLE 3

| M | Frequency of bus used | | |
|---|---|---|---|
| | Producer | Consumer | Total |
| 0 | 8 | 8 | 16 |
| 1 | 8 | 0 | 8 |
| 2 | 8 | 0 | 8 |
| 3 | 8 | 0 | 8 |
| 4 | 8 | 0 | 8 |
| 5 | 8 | 0 | 8 |
| 6 | 8 | 0 | 8 |
| 7 | 8 | 0 | 8 |
| 8 | 8 | 0 | 8 |

It is unusual for processing to cause only situation 1 or only the situation 2 in practical use. Usually programs causes a variety of situations. Here, for the purposes of simplification, assume the case where situations 1 and 2 occur in combination, at a one to one ratio. The frequency of bus 1 use in this case is as shown in TABLE 4 as obtained by summing TABLEs 2 and 3.

TABLE 4

| M | Frequency of bus used |
|---|---|
| 0 | 18 |
| 1 | 11 |
| 2 | 12 |
| 3 | 13 |
| 4 | 14 |
| 5 | 15 |
| 6 | 16 |

TABLE 4-continued

| M | Frequency of bus used |
|---|---|
| 7 | 17 |
| 8 | 16 |

Following the above assumption, from TABLE 4 it will be apparent that M=1 minimizes the frequency bus use (11 cycles). Comparing this with the cases of M=8 and 0 respectively causing the same operations as the update and invalidate types, the bus 1 is used for 16 and 18 cycles respectively. Thus, it is shown that M=1 achieves the best performance.

Of course it can not be ensured that situations 1 and 2 will occur at a one to one ratio as assumed above. This invention can, however, adapt to situations ranging to both extremes, by setting the M value accordingly.

D. Effects of the invention

As described the above, the cache controller of this invention operates in the same way as conventional update types for shared blocks which are frequently read/written by a plurality of processors P. That is, when write access occurs for each of such shared block, the relevant copies stored in a plurality of caches are immediately updated but not invalidated. In the contrast, the controller operates in the same way as conventional invalidate types for shared blocks which are not frequently accessed by other than one respective processor P. That is, only the copy in that one processor remains and the copies in the other caches are invalidated. This invention maximizes the cache performance in terms of the bus traffic, as a result.

Further, since the switching between the protocol types is automatically performed in response to the change of situations, optimized cache control is achieved. Furthermore since the protocol type can be set for each processor independently, the optimization is achieved for individual processors. Furthermore since the protocol switching is performed by the cache controls, conventional processors and memory control units can be used. Still further since the protocol switching does not need be performed with software such as a compiler or scheduler etc, the conventional software can be used.

Now that the invention has been described with respect to the preferred embodiment, various modifications will now become apparent to those of skill in the art. Thus, while the preferred embodiment has been set forth by way of example, the scope invention is defined by reference to the appended claims.

Having thus described our invention, what we claim as new and desire to secure by Letters Patent is:

1. In a multiprocessor system having a plurality of processors, each processor connected to a shared memory and a shared bus through a corresponding private cache, each private cache having a corresponding controller comprising:
   coherency means, coupled to the shared bus, for determining whether a data consistency maintenance procedure needs to be performed on a copy of shared data held by the private cache;
   data control information storage means for storing, for each piece of data stored in the private cache, address information of said data piece, status information of said data piece, and a count value which counts up upon an event of a first type related to an access to said data piece and counts down upon an event of a second type related to an access to said data piece;
   reference value storage means for storing a reference value related to said count value;
   comparison means for comparing said count value and said reference value; and,
   consistency maintenance means, coupled to said comparison means, said data control information storage means and said coherency means for selecting one of a plurality of data consistency maintenance procedures depending upon results of said comparing and said status information relating said data piece, and for performing said one of said data consistency maintenance procedures when said coherency means determines that said data consistency maintenance procedure needs to be performed.

2. The multiprocessor system of claim 1, wherein said data control information storage means comprises increment/decrement means for decrementing said count by one upon access to the shared data at the private cache, and for incrementing said count by one upon detecting, on said shared bus, a signal indicative that shared data is being modified at another private cache.

3. The multiprocessor system of claim 1 wherein said comparison means comprises means for generating a coincident signal when said count value is equal to said reference value and for generating a discordant signal when said count value is not equal to said reference value.

4. The multiprocessor system of claim 3 wherein each of said consistency maintenance means further comprises:
   detection means for detecting when at least one other private cache has modified a data piece shared by said private cache and said at least one other private cache;
   invalidation means, coupled to said detection means and said comparison means, for invalidating said data piece in response to a coincident signal from said comparison means; and,
   modification means, coupled to said detection means and said comparison means, for modifying said shared data piece at said private cache accordingly and for maintaining the status information to indicate that said data piece is shared in response to a discordant signal from said comparison means.

5. In a multiprocessor system having a plurality of processors, each processor connected to a shared memory and a shared bus through a corresponding private cache, each private cache having a corresponding controller comprising:
   shared status storage means for maintaining, for each data block stored in the private cache, data indicative of whether at least one other private cache has a copy of said data block;
   means, coupled to said shared status storage means, for determining a likelihood that the processor having said private cache will access said data block and a likelihood that another one of said processors will access said data block;
   data consistency maintenance procedure determination means for determining, for each data block shared by said private cache and said at least one other private cache, a data maintenance procedures to be used, based on said likelihood that the processor having said private cache will access said data block and said likelihood that said another one of said processors will access said data block; and, consistency maintenance means for performing said data maintenance procedure determined by said determination means, said consistency maintenance means being capable of performing at least two types of maintenance procedures.

6. In a multiprocessor system having a plurality of processors, each processor connected to a shared memory and a shared bus through a corresponding private cache, a method for maintaining cache coherency comprising the steps of:

determining whether a data consistency maintenance procedure needs to be performed on a copy of shared data held by the private cache;

maintaining for each piece of data stored in the private cache, address information of said data piece, status information of said data piece, and a count value which counts up upon an event of a first type related to the access to said data piece and counts down upon an event of a second type related to the access to said data piece;

storing a reference value;

comparing said count value and said reference value; and, selecting one of a plurality of data consistency maintenance procedures depending upon results of said comparing and said status information relating said data piece, and for performing said one of said data consistency maintenance procedures when it is determined that that said data consistency maintenance procedure needs to be performed.

7. The method of claim 6, comprising the further steps of:

decrementing said count by one upon access to the shared data at the private cache, and incrementing said count by one upon detecting, on said shared bus, a signal indicative that said shared data is modified at another private cache.

8. The method of claim 7, comprising the further steps of:

detecting when at least one other private cache has modified a data piece shared by said private cache and said at least one other private cache;

invalidating said data piece when said count is equal to said reference value; and modifying said shared data piece at said private cache when said count is not equal to said reference value.

* * * * *